United States Patent
Lippons

(10) Patent No.: US 6,959,942 B2
(45) Date of Patent: Nov. 1, 2005

(54) BALL HITCH FOR AN IMPLEMENT DRAWBAR OF AN AGRICULTURAL VEHICLE

(75) Inventor: Christiaan A. C. Lippons, Sint-Laureins (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/689,772

(22) Filed: Oct. 21, 2003

(65) Prior Publication Data

US 2005/0082788 A1  Apr. 21, 2005

(51) Int. Cl.[7] .................................................. B60D 1/06
(52) U.S. Cl. ..................... 280/494; 280/492; 280/493; 403/131
(58) Field of Search ................ 403/122, 131, 403/141, 142, 319, 316; 280/492–494

(56) References Cited

U.S. PATENT DOCUMENTS

| | | | | |
|---|---|---|---|---|
| 3,151,882 A | * | 10/1964 | Foxwell et al. | 403/122 |
| 3,493,252 A | * | 2/1970 | Watson et al. | 403/122 |
| 3,876,232 A | * | 4/1975 | Pertusi | 403/122 |
| 4,072,320 A | * | 2/1978 | Powell | 403/122 |
| 4,185,945 A | * | 1/1980 | Gill | 403/131 |
| 5,069,571 A | * | 12/1991 | Matczak et al. | 403/131 |
| 5,516,140 A | * | 5/1996 | Hinte | 280/494 |
| 5,873,595 A | * | 2/1999 | Hinte | 280/494 |
| 5,941,551 A | * | 8/1999 | Harman et al. | 280/494 |
| 6,520,682 B2 | * | 2/2003 | Kletzli et al. | 403/122 |
| 6,764,092 B1 | * | 7/2004 | Greaves, Jr. | 280/494 |
| 2002/0192016 A1 | * | 12/2002 | Monninfhoff et al. | 403/122 |
| 2003/0094786 A1 | * | 5/2003 | Greaves | 280/493 |

* cited by examiner

Primary Examiner—Matthew Luby
(74) Attorney, Agent, or Firm—John William Stader

(57) ABSTRACT

A ball hitch is disclosed for connecting a drawbar of an agricultural vehicle to a coupling pin of a trailer. The ball hitch comprises a ball element having a part-spherical outer surface and a cylindrical bore for receiving the coupling pin of the trailer. The socket element is constructed as a sleeve that is removably mountable in the drawbar and has a part-spherical inner surface within which the ball element is received to allow the coupling pin to swivel about mutually orthogonal axes relative to the drawbar.

5 Claims, 1 Drawing Sheet

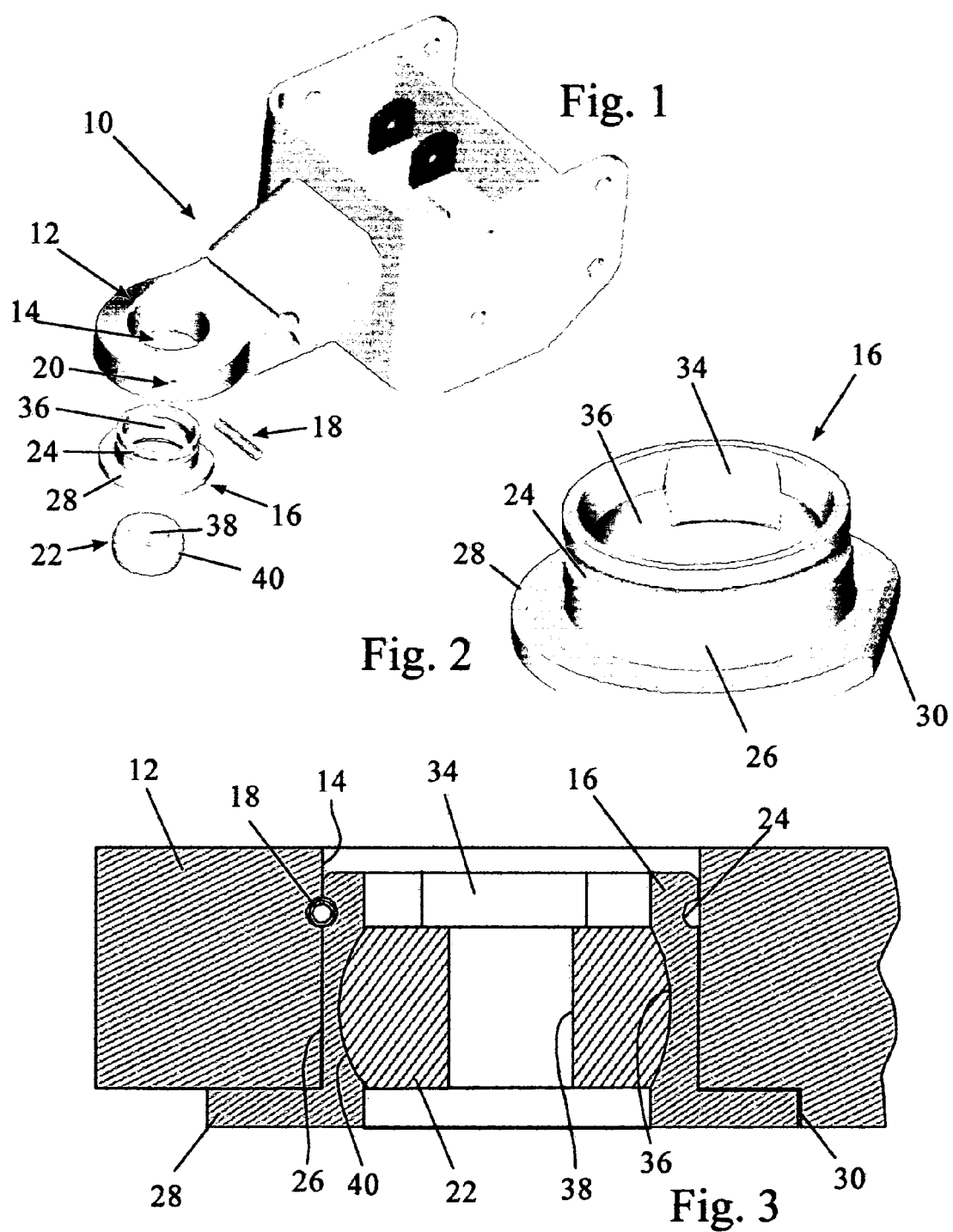

BALL HITCH FOR AN IMPLEMENT DRAWBAR OF AN AGRICULTURAL VEHICLE

BACKGROUND OF THE INVENTION

The present invention relates generally to hitches, and more specifically to a ball hitch for an implement drawbar of an agricultural vehicle.

U.S. Pat. No. 3,493,252 describes a ball and socket joint for a three point hitch of a tractor in which the drawbar is formed with a part-spherical socket which receives a part-spherical ball having a central bore, the latter, in use, receiving a coupling pin of a trailer. Because the diameter of coupling pins can vary, the ball is made in such a manner that it can be replaced by another of different inner diameter. In particular, part of the spherical surface of the ball is cut away to provide a portion of gradually reduced radius terminating at a radial face so that the ball may be inserted in a complimentary socket and prevented from being removed when it is turned to another position in the socket.

Though such an arrangement allows the ball to be replaced by another when it is worn or to adapt the joint to a different size of coupling pin, it does not allow for the fact that the part-spherical surface of the drawbar is prone to wear and its replacement is complex and costly. It would be very advantageous to have a ball hitch that avoids the problems mentioned immediately above.

SUMMARY OF THE INVENTION

It is thus an object of the instant invention to provide a ball hitch that avoids the excessive wear problems encountered in prior art devices.

It is another object of the instant invention to provide a ball hitch for connecting a drawbar of an agricultural vehicle to a coupling pin of a trailer, the ball hitch comprising a ball element having a part-spherical outer surface and a cylindrical bore for receiving the coupling pin of the trailer, and a socket element constructed as a sleeve removably mountable in the drawbar of the vehicle and having a part-spherical inner surface within which the ball element is received to allow the coupling pin to swivel about mutually orthogonal axes relative to the drawbar.

It is another object of this instant invention to provide a ball hitch wherein the part-spherical socket is formed as part of a replaceable sleeve and the drawbar does not have a part-spherical surface that is subjected to wear.

It is a further object of the instant invention to provide a ball hitch wherein an entry groove is provided on the inner surface of the sleeve to allow the ball element to be removed and replaced while the sleeve remains mounted on the drawbar. The provision of such an entry groove enables the ball element to be replaced to suit coupling pins of different sizes and this is achieved with a ball element having only a part-spherical outer surface, thus making the ball element simpler and less costly to manufacture than in U.S. Pat. No. 3,493,252.

It is a further object of the instant invention to provide a ball hitch wherein one end of the sleeve is formed with an annular flange to protect the underside of the drawbar from wear, preventing the drawbar from making any contact with the trailer and all the parts of the ball hitch that are subjected to wear are readily replaceable.

It is a further object of the instant invention to provide a ball hitch wherein the annular flange projects radially outwards from the sleeve and is formed with a flat to prevent the sleeve from rotating relative to the drawbar.

It is a still further object of the instant invention to provide a ball hitch with a preferred embodiment in which the sleeve is locked in the drawbar to prevent axial movement by a groove formed in the outer surface of the sleeve to receive a pin to prevent the sleeve from being withdrawn from the drawbar. For ease of manufacture, the groove may extend over 360° around the outer surface of the sleeve, allowing the sleeve to be turned on a lathe.

It is an even still further object of the instant invention to provide a ball hitch that may be assembled without special tools and, to minimise manufacturing cost, the sleeve may be retained by means of a rolled steel pin inserted into a bore in the drawbar which extends tangentially with respect to the groove in the sleeve. Such a pin needs only to be drifted into and out of the drawbar using a hammer and a punch to allow the entire ball hitch to be removed and replaced.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is a perspective view of a drawbar and all the components of a ball hitch of the invention;

FIG. 2 is a perspective view of the socket element of the ball hitch, drawn to an enlarged scale; and FIG. 3 is a section through the ball hitch when mounted in a drawbar.

DESCRIPTION OF THE PREFERRED EMBODIMENT

The drawings show a drawbar 10 of a tractor having at its end a ring 12 with a through bore 14. The ball hitch of the invention comprises a sleeve 16 having an inner part-spherical surface 36 which acts as a socket element to receive a ball element 22 with a part-spherical outer surface 40. The ball element 22 has a central through bore 38 for receiving the coupling pin of a trailer.

To assemble the ball hitch in the drawbar, the sleeve 16, which has a cylindrical outer surface 26, is pushed up from below into the bore 14 in the drawbar 10 until a flange 28 projecting radially from the sleeve 16 abuts the underside of the ring 12. The sleeve 16 is then retained in the drawbar 10 by drifting a rolled steel retainer pin 18 into a bore 20. The pin 18 passes tangentially through a continuous groove 24 in the outer surface 26 of the sleeve 16 and this prevents axial movement of the sleeve 16 once it is in place. The flange 28 is also formed with a flat 30 which abuts a shoulder defined by the underside of the drawbar 10 and in this way the sleeve 16 is prevented from rotating relative to the drawbar 10.

The ball element 22 can be inserted into and removed from the sleeve 16 either before or after it has been inserted into the drawbar 10. This is facilitated by two entry grooves 34, opposite each other (only one shown) of the same width as the height of the ball element 22 which is formed on the inner surface 36 of the sleeve 16. The ball element 22 is inserted into the sleeve 16 by aligning it so that it slides down the grooves 34 with its central through bore lying horizontally. Once the ball element 22 has reached a position in which the two part-spherical surfaces 36 and 40 are concentric, it can be rotated about an axis normal to the plane of FIG. 3 to bring it into the illustrated position. Once it has been rotated in this manner, it can no longer move axially relative to the sleeve 16.

In use, the ball element 22 receives the coupling pin of the trailer and moves relative to the sleeve 16 about mutually orthogonal axes to permit a wide range of yaw movement of the trailer relative to the tractor and a more limited range of roll and pitch movement. The plate on the trailer carrying the coupling pin does not contact the drawbar but contacts instead the flange 28 at the bottom of the sleeve 16.

Wear can occur both in the ball element 22 and in the sleeve 16 at the part-spherical surfaces 36 and 40. When the ball element 22 is worn or when it is desired to use a trailer with a coupling pin of different diameter, the ball element 22 can be replaced while the sleeve 16 remains in situ in the drawbar 10. After the coupling pin has been removed from the through bore 38 in the ball element 22, the latter is rotated so that its upper and lower flat surfaces lie in line with the entry groove 34. It can then be pulled out of the sleeve 16 using a light force and a new ball element 22 can be mounted in the sleeve 16.

If the part-spherical surface 36 of the sleeve 16 is worn, or if the flange 28 wears, the sleeve 16 can be replaced by first drifting the rolled steel pin 18 out of the bore 20 in the ring 12 and sliding the old sleeve 16 out from under the drawbar 10.

It can thus be seen that the invention provides a ball hitch that can easily be adapted to accept coupling pins of different sizes. Furthermore, the invention allows all the parts of the ball hitch to be replaced readily, without the use of special tools and it safeguards all the components that are permanently attached to the tractor and the trailer so that they are protected from wear, all the parts prone to wear being readily replaceable.

Having thus described the invention, what is claimed is:

1. A ball hitch for connecting the drawbar of an agricultural vehicle to a coupling pin of a trailer, the ball hitch comprising a ball element having a part-spherical outer surface and a cylindrical bore for receiving the coupling pin of the trailer, and a socket element constructed as a sleeve removably mountable in the drawbar of the vehicle and a having a part-spherical inner surface within which the ball element is received to allow the coupling pin to swivel about mutually orthogonal axes relative to the drawbar, an entry groove provided on the inner surface of the sleeve to allow the ball element to be removed and replaced while the sleeve remains mounted on the drawbar, and one end of the sleeve is provided worth an annular flange to protect the underside of the drawbar from wear.

2. A ball hitch as claimed in claim 1, wherein the annular flange projects radially outwards from the sleeve and is formed with a flat to prevent the sleeve from rotating relative to the drawbar.

3. A ball hitch as claimed in claim 2, wherein a groove is formed in the outer surface of the sleeve to receive a retainer pin to prevent the sleeve from being withdrawn from the drawbar.

4. A ball hitch as claimed in claim 3, wherein the groove extends over 360° around the outer surface of the sleeve.

5. A ball hitch as claimed in claim 4, wherein said retainer pin is rolled steel and is provided for insertion into a bore in the drawbar which extends tangentially with respect to the groove in the sleeve.

* * * * *